United States Patent
Shcheglov

(10) Patent No.: US 7,818,871 B2
(45) Date of Patent: Oct. 26, 2010

(54) DISC RESONATOR GYROSCOPE FABRICATION PROCESS REQUIRING NO BONDING ALIGNMENT

(75) Inventor: Kirill V. Shcheglov, Los Angeles, CA (US)

(73) Assignee: California Institute of Technology, Pasadena, CA (US)

( * ) Notice: Subject to any disclaimer, the term of this patent is extended or adjusted under 35 U.S.C. 154(b) by 553 days.

(21) Appl. No.: 11/828,263

(22) Filed: Jul. 25, 2007

(65) Prior Publication Data

US 2010/0024560 A1 Feb. 4, 2010

Related U.S. Application Data

(60) Provisional application No. 60/833,124, filed on Jul. 25, 2006.

(51) Int. Cl.
*G01P 15/10* (2006.01)
*G01R 3/00* (2006.01)
(52) U.S. Cl. .................................. 29/592.1; 73/504.12
(58) Field of Classification Search .............. 73/504.04, 73/514.29, 504.12; 29/592.1
See application file for complete search history.

(56) References Cited

U.S. PATENT DOCUMENTS

| | | | |
|---|---|---|---|
| 6,085,594 A | 7/2000 | Gutierrez et al. | |
| 6,219,145 B1 | 4/2001 | Gutierrez et al. | |
| 6,269,322 B1 * | 7/2001 | Templeton et al. | 702/150 |
| 6,367,786 B1 | 4/2002 | Gutierrez et al. | |
| 6,796,179 B2 | 9/2004 | Bae et al. | |
| 6,823,734 B1 | 11/2004 | Hayworth et al. | |
| 6,944,931 B2 | 9/2005 | Shcheglov et al. | |
| 6,955,084 B2 | 10/2005 | Challoner et al. | |
| 6,990,863 B2 | 1/2006 | Challoner et al. | |
| 7,017,410 B2 | 3/2006 | Challoner et al. | |
| 7,040,163 B2 | 5/2006 | Shcheglov et al. | |
| 7,093,486 B2 | 8/2006 | Challoner et al. | |
| 7,168,318 B2 | 1/2007 | Challoner et al. | |
| 7,285,844 B2 | 10/2007 | Hayworth et al. | |
| 7,347,095 B2 | 3/2008 | Shcheglov et al. | |
| 7,396,478 B2 | 7/2008 | Hayworth et al. | |
| 2005/0172714 A1 * | 8/2005 | Challoner et al. | 73/504.12 |
| 2006/0037417 A1 | 2/2006 | Shcheglov et al. | |
| 2006/0211169 A1 * | 9/2006 | Jafri et al. | 438/106 |
| 2007/0119258 A1 * | 5/2007 | Yee | 73/649 |

* cited by examiner

*Primary Examiner*—Hezron Williams
*Assistant Examiner*—Rose M Miller
(74) *Attorney, Agent, or Firm*—Milstein Zhang & Wu LLC; Joseph B. Milstein

(57) ABSTRACT

A method of fabricating a resonant vibratory sensor, such as a disc resonator gyro. A silicon baseplate wafer for a disc resonator gyro is provided with one or more locating marks. The disc resonator gyro is fabricated by bonding a blank resonator wafer, such as an SOI wafer, to the fabricated baseplate, and fabricating the resonator structure according to a pattern based at least in part upon the location of the at least one locating mark of the fabricated baseplate. MEMS-based processing is used for the fabrication processing. In some embodiments, the locating mark is visualized using optical and/or infrared viewing methods. A disc resonator gyroscope manufactured according to these methods is described.

7 Claims, 14 Drawing Sheets

DISC RESONATOR GYROSCOPE FABRICATION PROCESS REQUIRING NO BONDING ALIGNMENT

CROSS-REFERENCE TO RELATED APPLICATIONS

This application claims priority to and the benefit of U.S. provisional patent application Ser. No. 60/833,124, filed Jul. 25, 2006, which application is incorporated herein by reference in its entirety. This application is also related to co-pending U.S. patent application Ser. No. 11/600,258, filed Nov. 15, 2006, which application is incorporated herein by reference in its entirety.

STATEMENT REGARDING FEDERALLY FUNDED RESEARCH OR DEVELOPMENT

The invention described herein was made in the performance of work under a NASA contract number NASA-1407, and is subject to the provisions of Public Law 96-517 (35 U.S.C. §202) in which the Contractor has elected to retain title.

FIELD OF THE INVENTION

The invention relates to disc resonator gyroscope vibratory devices in general and particularly to a process for fabricating disc resonator gyroscope resonant vibratory devices that do not require alignment of components at the bonding step of the process, and to disc resonator gyroscopes fabricated using the process.

BACKGROUND OF THE INVENTION

Resonant devices, such as resonant vibratory devices and sensors, have long served various technical functions in many important industries. For example, in past decades resonant devices such as oscillators, vibratory sensors, gyroscopes and vibratory accelerometers, have been adapted in military and transportation applications.

In recent years, however, the demands of such industries have shifted or increased, and, in turn, characteristics and/or performance levels of resonant devices that were previously accepted as satisfactory have become unsuitable. For example, inertial technology in various industries had long relied upon inertial measurement units (IMUs) that employed fiber optic gyroscopes (FOGs) or ring laser gyroscopes (RLGs). Over time, it became clear that such devices tended to be disadvantageously large and power consumptive and/or suffered from issues relating to dead-band non-linearities and/or light source life. The large size/volume of such devices became a particular problem, since industries in which they were being used, especially the military and transportation industries, were increasingly seeking to incorporate such devices in miniature and/or portable platforms.

This led those in the art to begin developing Micro-Electro-Mechanical System (or "MEMS")-based resonant devices, such as MEMS-based gyroscopes. MEMS-based resonant devices offered several critical advantages (e.g., small volume and mass, low power usage, reduced cost through batch fabrication), which led to them being adopted on a widespread scale in various cutting edge technologies, such as in military sensors and weapons.

In the fabrication of such devices, for example the Disc Resonator Gyro (or Disc Resonator Gyroscope, or "DRG"), sophisticated fabrication methods are used. One approach to fabricating DRGs is to use substantially conventional MEMS processing methods, in which structures exhibiting extremely precise geometrical definition and relationships can be produced. In fabrication of DRGs using these conventional methods, it has been the usual procedure to process two sections of the device on separate wafers, such as silicon wafers, and then to precisely align the two sections prior to bonding the two sections together to produce a complete DRG device. The conventional process requires alignment at a precision that is at or beyond the limits of conventional mechanical alignment techniques, considering in particular that alignment in three degrees of freedom (e.g., length, width, and angular orientation) is required to completely align two wafers having MEMS structures defined therein. The problems associated with the alignment step have proven to be severe and they can severely and negatively impact device yield and thereby device cost and availability.

There is a need for fabrication methods that allow the convenient fabrication of DRG devices in higher yields.

SUMMARY OF THE INVENTION

In one aspect, the invention relates to a method of fabricating a resonant vibratory sensor. The method comprises the steps of providing a fabricated baseplate wafer having present thereon at least one locating mark; observing a location of the at least one locating mark; bonding to the fabricated baseplate wafer a blank resonator wafer; affixing to the otherwise blank resonator wafer at least one locating mark at a location defined relative to the at least one locating mark that was observed on the fabricated baseplate; and fabricating the resonator structure in the blank resonator wafer in relation to the at least one locating mark affixed to the blank resonator wafer. The result of these steps is the fabricating of a resonant vibratory sensor.

In one embodiment, the resonant vibratory sensor is a disc resonator gyroscope. In one embodiment, the disc resonator gyroscope is fabricated in silicon.

In another aspect, the invention features a resonant vibratory sensor. The resonant vibratory sensor comprises a fabricated baseplate wafer having present thereon at least one locating mark in a specified location; and a resonator wafer bonded to the fabricated baseplate, the resonator wafer comprising a structure fabricated according to a pattern based at least in part upon the location of the at least one locating mark of the fabricated baseplate.

In one embodiment, the resonant vibratory sensor is a disc resonator gyroscope. In one embodiment, the disc resonator gyroscope is fabricated in silicon. In one embodiment, the at least one locating mark is configured to be observed after the resonator wafer is bonded to the fabricated baseplate.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

Figure 1B:
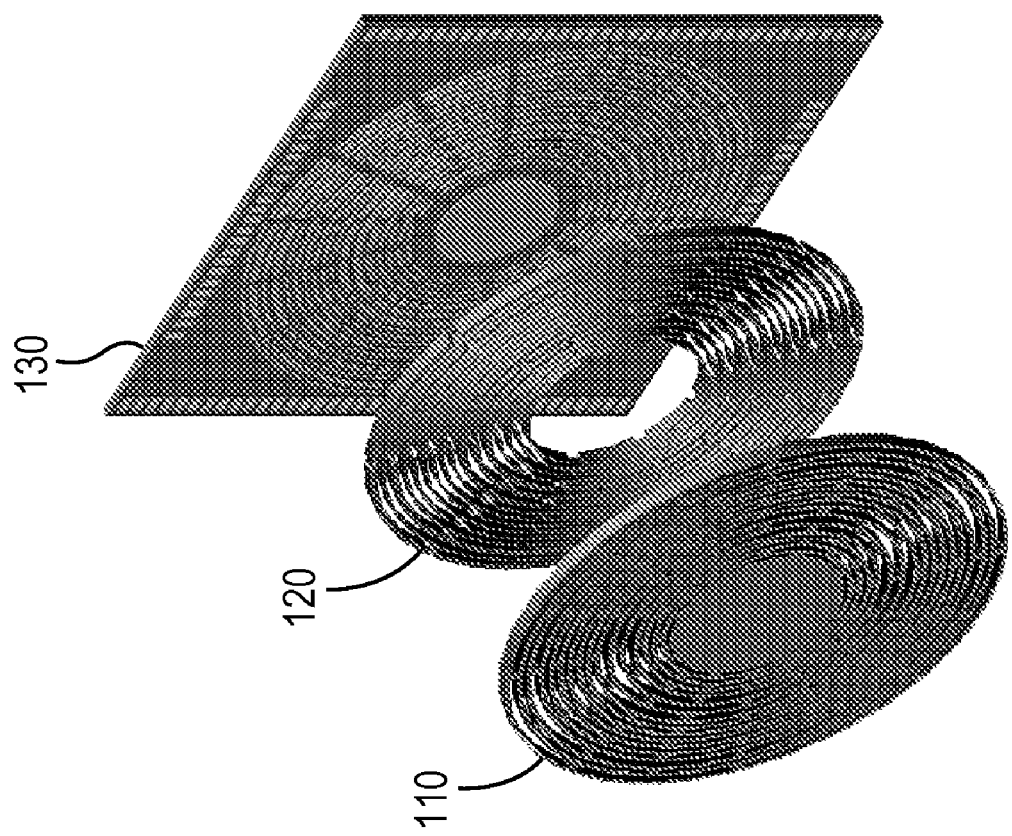
FIGS. 1A-1C illustrate various views of an exemplary disc resonator gyroscope according to principles of the invention.

As used herein, the following acronyms are to be understood as expressed immediately hereinbelow unless otherwise defined herein:

ASIC Application Specific Integrated Circuit

CCD Charge Coupled Device

COTS Commercial Off-the-Shelf

CTE Coefficient of Thermal Expansion

CVD Chemical Vapor Deposition

DRIE Deep Reactive Ion Etch

DSP Digital Signal Processing

EOIR Electro-Optical Infrared

FOG Fiber Optic Gyroscope

FPGA Field Programmable Gate Array

HRG Hemispherical Resonator Gyroscope

IC Integrated Circuit

ICP Inductively-Coupled Plasma

IMU Inertial Measurement Unit

LCC Leadless Chip Carrier

MEMS Micro Electro-Mechanical System

MOEMS Micro Opto-Electro-Mechanical Systems

Ni Nickel

PECVD Plasma Enhanced Chemical Vapor Deposition

Q Mechanical Quality Factor

RIE Reactive Ion Etching

RLG Ring Laser Gyroscope

Si Silicon

DETAILED DESCRIPTION OF THE INVENTION

The present application describes a novel fabrication process for producing disc resonator gyroscopes (DRGs). The process eliminates the necessity to fabricate two sections of the DRG and subsequently to perform the difficult steps of aligning and bonding the sections together using precision alignment tools. In the methods of the invention, the base plate wafer is processed using conventional MEMS technology. In some embodiments, the base plate comprises a silicon wafer that is processed to provide the base plate structure and optionally to comprise control circuitry and/or input/output circuitry. According to the principles of the invention, a blank resonator wafer (e.g., a wafer destined to comprise the resonator structure after further processing) is bonded to the processed base plate wafer. As needed, alignment marks are subsequently lithographically defined on the blank resonator wafer using back-side alignment to marks or structures present on the processed base plate wafer as reference positions. The alignment marks present on the base plate wafer can be used to define known positions of a lithographic system, so that additional alignment marks produced on the exposed surface of a resonator wafer are defined relative to the alignment marks present on the base plate wafer. The structures then produced in the resonator wafer can be fabricated in known alignment to the structures of the base plate wafer, and the need to perform precise mechanical alignment of the two separately produced structures is eliminated. The alignment marks on the base plate wafer can be visualized using infrared (IR) camera technology when the blank resonator wafer is a silicon wafer, because silicon is transparent in the infrared. In other embodiments, alignment marks present on the underside of the base plate wafer can be used by visualization through the support holding up the base plate wafer (e.g., through vias in an opaque support structure, or through a transparent support structure). In still other embodiments, if the alignment marks on the base plate wafer cannot be visualized after the blank resonator wafer is bonded to the base plate wafer, the alignment marks on the base plate wafer can be used to generate intermediate alignment marks on a surface that is visually accessible prior to bonding the blank resonator wafer to the base plate wafer, such as on a support structure used to hold the base plate wafer in the processing equipment, and alignment marks on the blank resonator can then be generated from the known alignment marks on the support structure. In still further embodiments, the location or features of the eutectic bonding medium, such as edges of the eutectic bonding medium, can be used to define positions for alignment marks on the blank resonator wafer.

The term "resonant vibratory sensor" refers to devices and equipment (e.g., oscillators, gyroscopes, accelerometers, chip-scale clocks, RF filters and chemical sensors) that are usable as IMUs and in various other applications. By way of non-limiting example, a resonant vibratory gyroscope can be a disc resonator gyroscope (DRG) or a hemispherical resonator gyroscope (HRG). The term "MEMS-based" refers to a device that has a volume in the range of cubic micrometers to cubic centimeters, including all subranges there between.

Figure 1A:
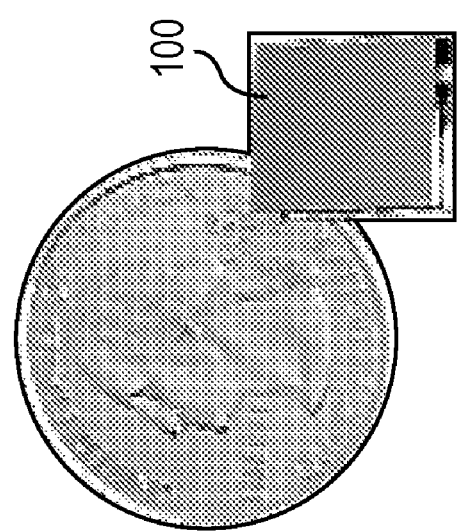
Figure 1C:
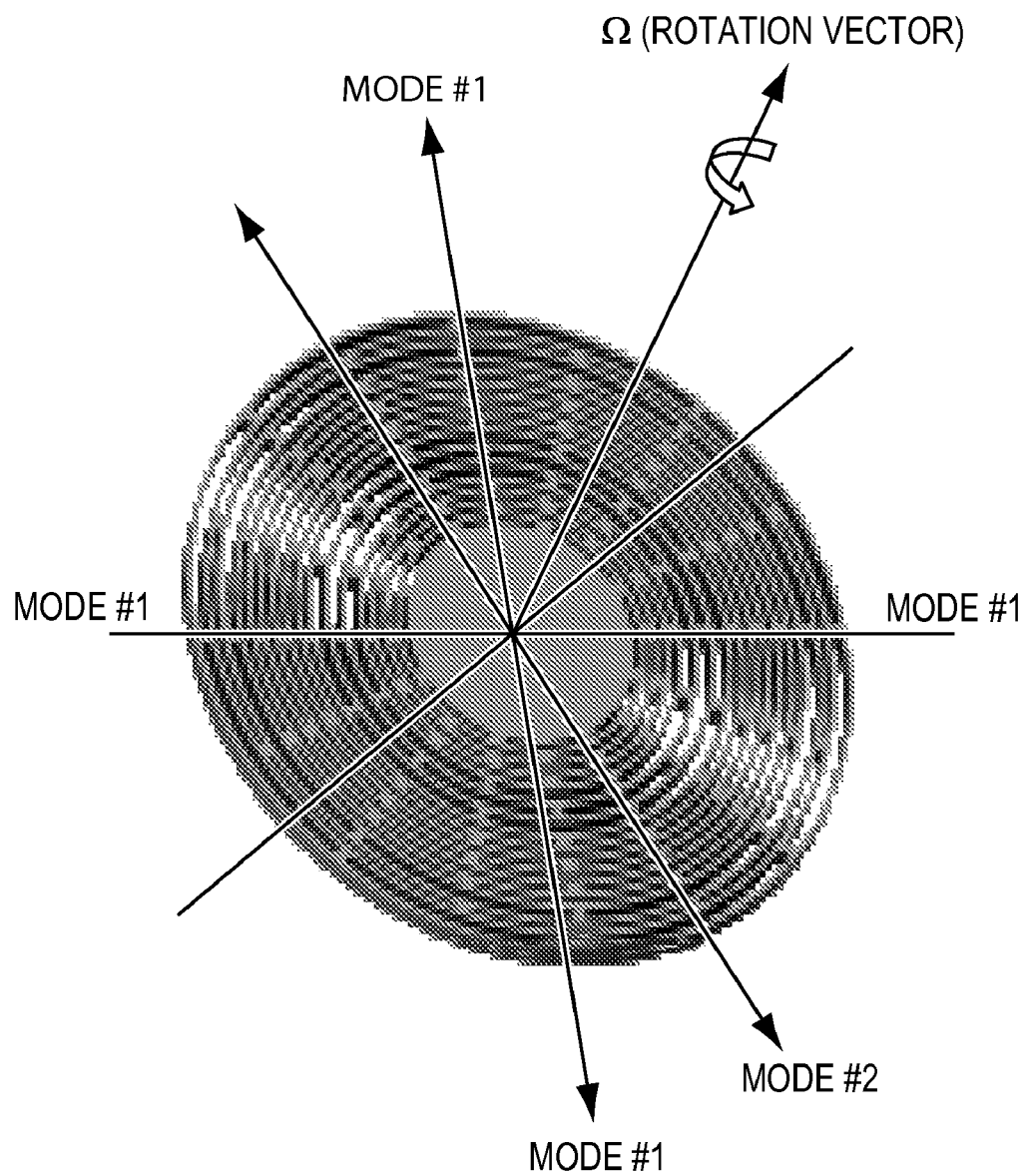

FIGS. 1A-1C depict several views of an exemplary resonant vibratory sensor 100, which, as shown, is a DRG 100.

FIG. 1A is an illustration showing a single axis Disc Resonator Gyroscope (DRG), with a United States quarter dollar coin as a size reference. The Disc Resonator Gyroscope 100 shown measures 11.4×11.4×1.3 mm, or 0.16 cubic centimeter in volume. The in-run bias stability has been measured at 0.25 deg/hr.

FIG. 1B is an illustration showing an exploded view of a DRG. Multiple narrow periodic slot segments etched through a planar wafer disc 10 (the front-most structure in FIG. 1B) simultaneously define a unique in-plane resonator structure and a matching large area electrode array 120 (the middle structure in FIG. 1B) for capacitive sense and actuation having very high area efficiency. The base or support plate 130 includes contacts for making electrical connection to drive the electrodes and to sense signals.

FIG. 1C is an illustration showing the degenerate oscillation modes (Mode #1 and Mode #2) of the resonator ring structure, in which the arrows indicate instantaneous direction of motion of mass elements of the ring structure. Each mode includes an expansive component and a compressive component, oriented at an angle of 90 degrees to each other. For example, for Mode #1 as depicted, the expansive component is oriented along what would be considered the Y axis of the disc (e.g., the arrows pointing away from the center of the disc) and the compressive component is oriented along what would be considered the X axis of the disc (e.g., the arrows pointing toward the center of the disc). The corresponding components of Mode #2 are rotated relative to the components of Mode #1 by 45 degrees as shown.

Figures 2A, 2B, 2C:
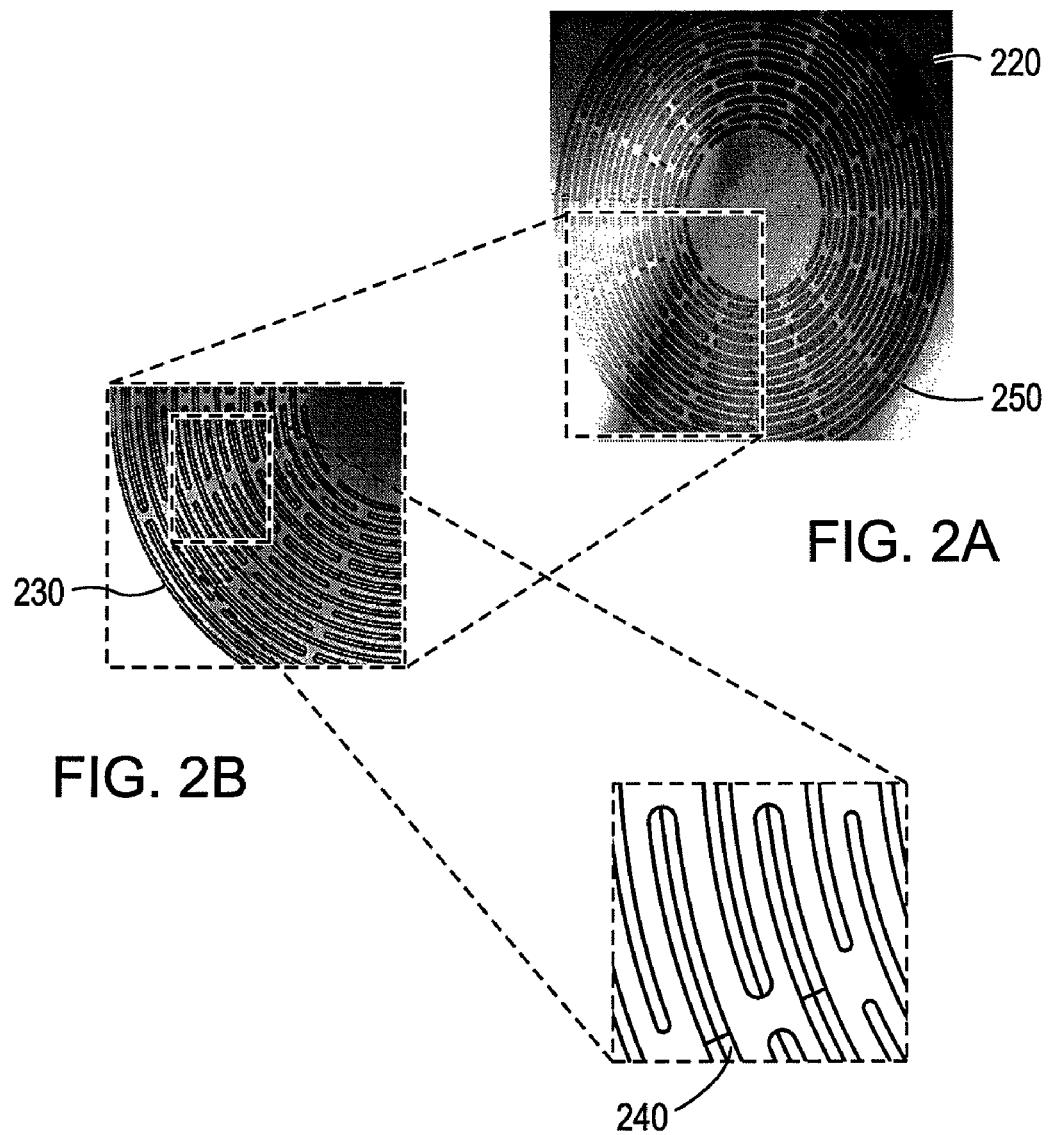
FIGS. 2A, 2B and 2C are plan views that illustrate successively enlarged sections of a portion of the disc resonator gyroscope of FIGS. 1A-1C.

FIGS. 2A, 2B and 2C are plan views that illustrate successively enlarged sections of a portion of the disc resonator gyroscope of FIGS. 1A-1C. The exemplary DRG 100 includes a plurality of trenches 250, which individually and collectively define the structure and the electrodes of the DRG. Multiple narrow periodic slot segments 210 are etched through a planar wave disc 220 and simultaneously define an in-plane resonator structure 230 of the DRG and a matching large area electrode array 240. This will be further explained hereinafter with respect to the discussion of the fabrication of the devices.

The DRG 100 generally has two modes of operation. A sinusoidal voltage applied to one set of its electrodes drives its ring structure into a quadrupole first oscillation mode, for example Mode #1 in FIG. 1C. This motion couples to the Coriolis force, thus exciting the second, degenerate, quadrupole mode of its ring structure (e.g., Mode #2 of FIG. 1C). A feedback voltage signal applied to a second set of electrodes (rotated from the first set of electrodes by 45°) suppresses the motion of the second mode.

These dual modes of operation provide certain advantages and benefits. A direct proportionality exists between the Coriolis rate input and the feedback voltage. Therefore, the rotation rate of the DRG 100 can be extracted from a measurement of the feedback voltage. This allows for a high degree of designed-in symmetry of the DRG 100, which, in turn, ensures minimal coupling to external disturbances. The centrally mounted DRG 100 resonator supports two degenerate elastic inertial waves for Coriolis sensing having zero momentum relative to the baseplate, thus enabling all modal momentum of the DRG to remain locked within the resonating medium. This feature, which eliminates noisy and non-repeatable anchor losses, and, with appropriate geometric design of the DRG 100 resonator, results in a very high and very stable mechanical quality limited only by material damping. This very high quality, precision photolithographically-defined symmetry leads to low gyro bias, which is highly repeatable and predictable over temperature extremes. The co-etched resonator/electrode structure of the DRG 100 efficiently maximizes use of the area of the DRG to increase sensing capacitance, thus increasing the signal to noise ratio. Further, the axially symmetric design of the DRG 100 and its nodal support ensure minimal coupling to package stresses. The DRG is predicted, via load analysis, to survive acceleration loads in excess of one thousand times the acceleration of gravity (e.g., over 1000 g). These various benefits and advantages of the geometrical design of a DRG have been achieved by conventional MEMS-based resonant vibratory sensors.

Figure 3A:
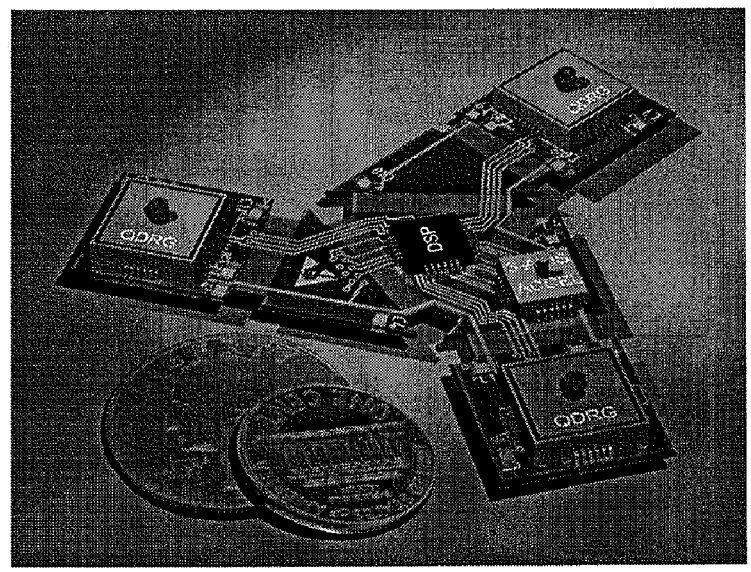
FIGS. 3A and 3B are images that illustrate multi-axis embodiments of sensors comprising a plurality of MEMS-based resonant vibratory sensors.
Figure 3B:
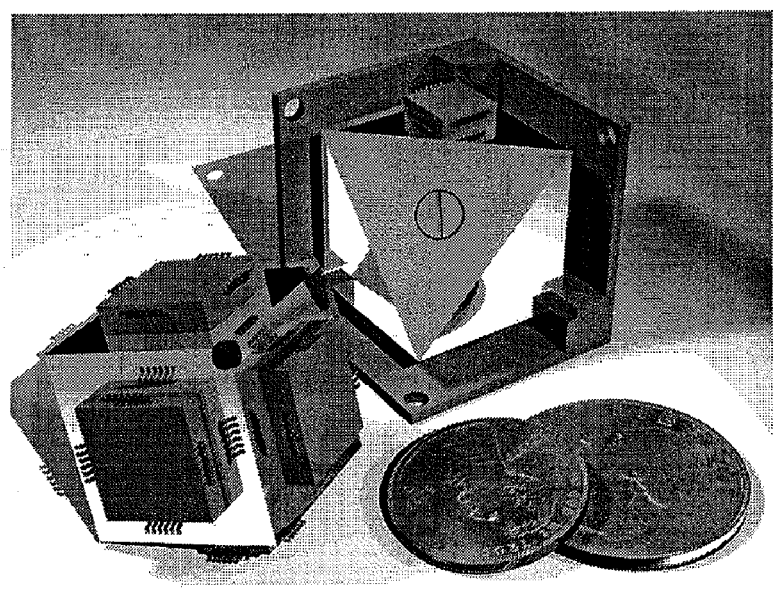

FIGS. 3A and 3B are images that illustrate multi-axis embodiments of sensors comprising a plurality of MEMS-based resonant vibratory sensors. FIG. 3A illustrates a design using a flex mounted triad of gyros, 3 axis accelerometer and central DSP. FIG. 3A illustrates a design using a DRG based 3-axis IMU. The volume of the assembly in FIG. 3B is less than 1 cubic inch. United States one cent and quarter dollar coins are shown in each drawing to provide a sense of the dimensions of each multi-axis sensor.

Figure 4A:
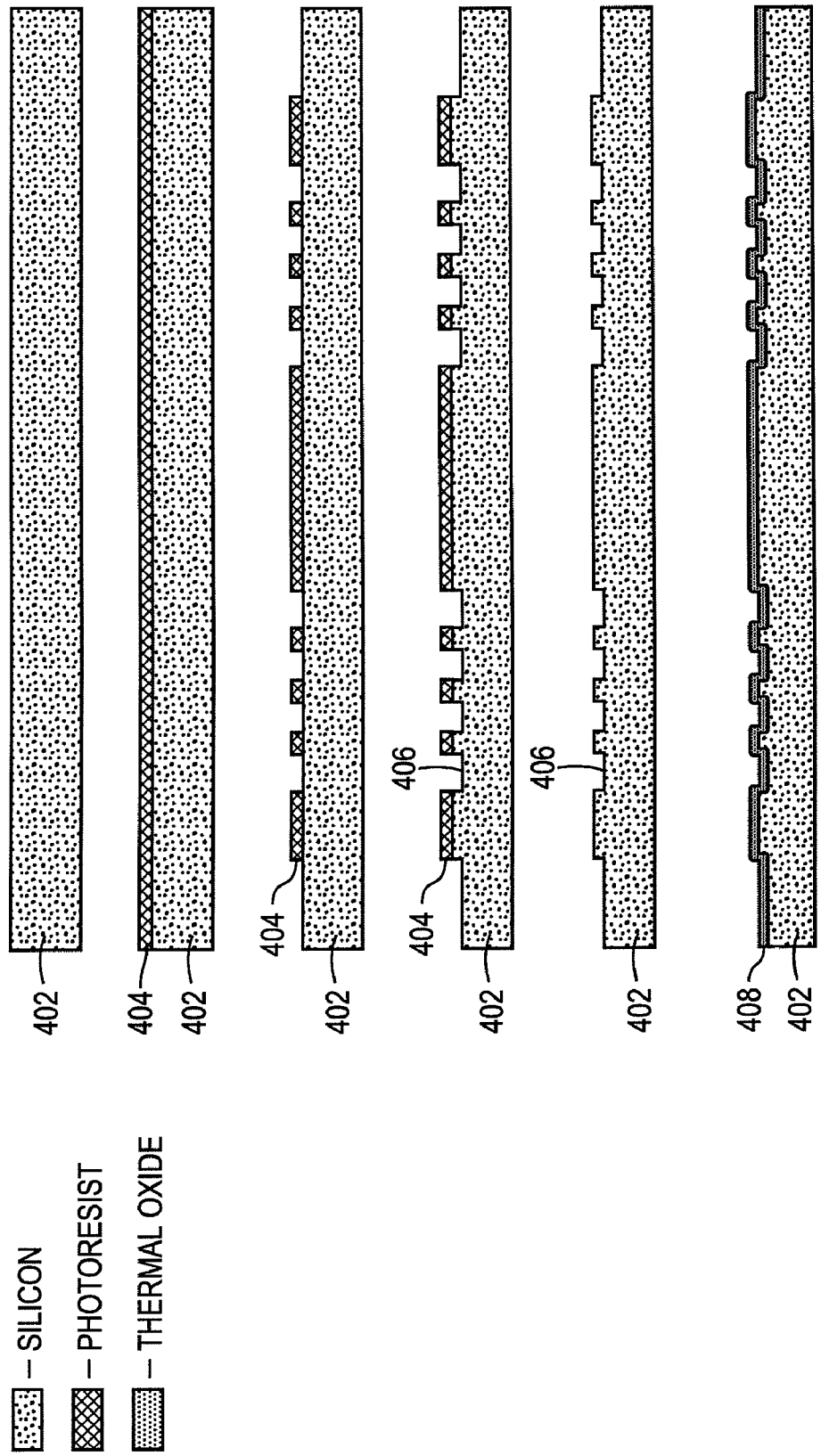
FIGS. 4A-4G are cross sectional illustrations taken through a DRG along a diameter thereof, and illustrate the fabrication process for a DRG according to principles of the invention.
Figure 4B:
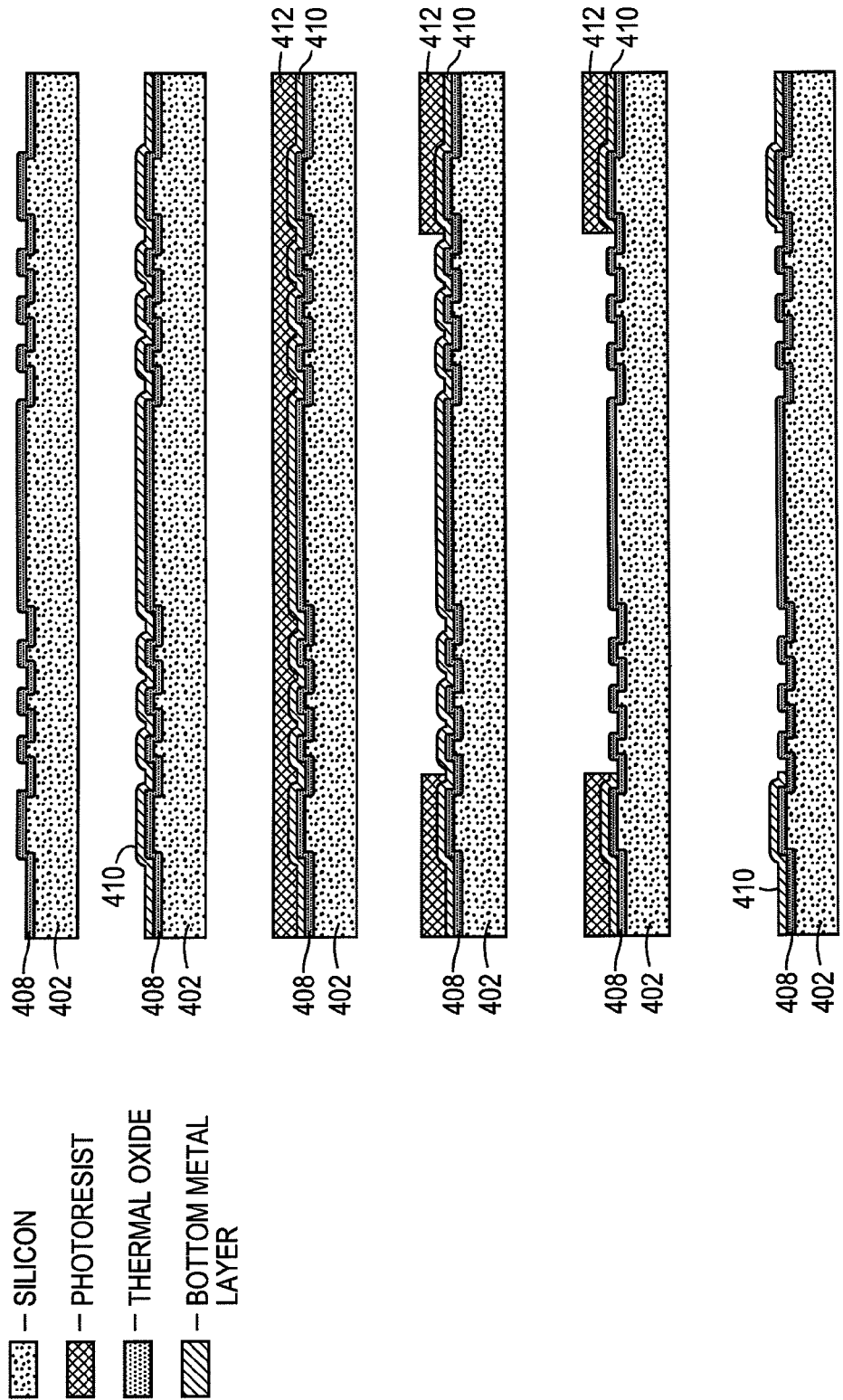
Figure 4C:
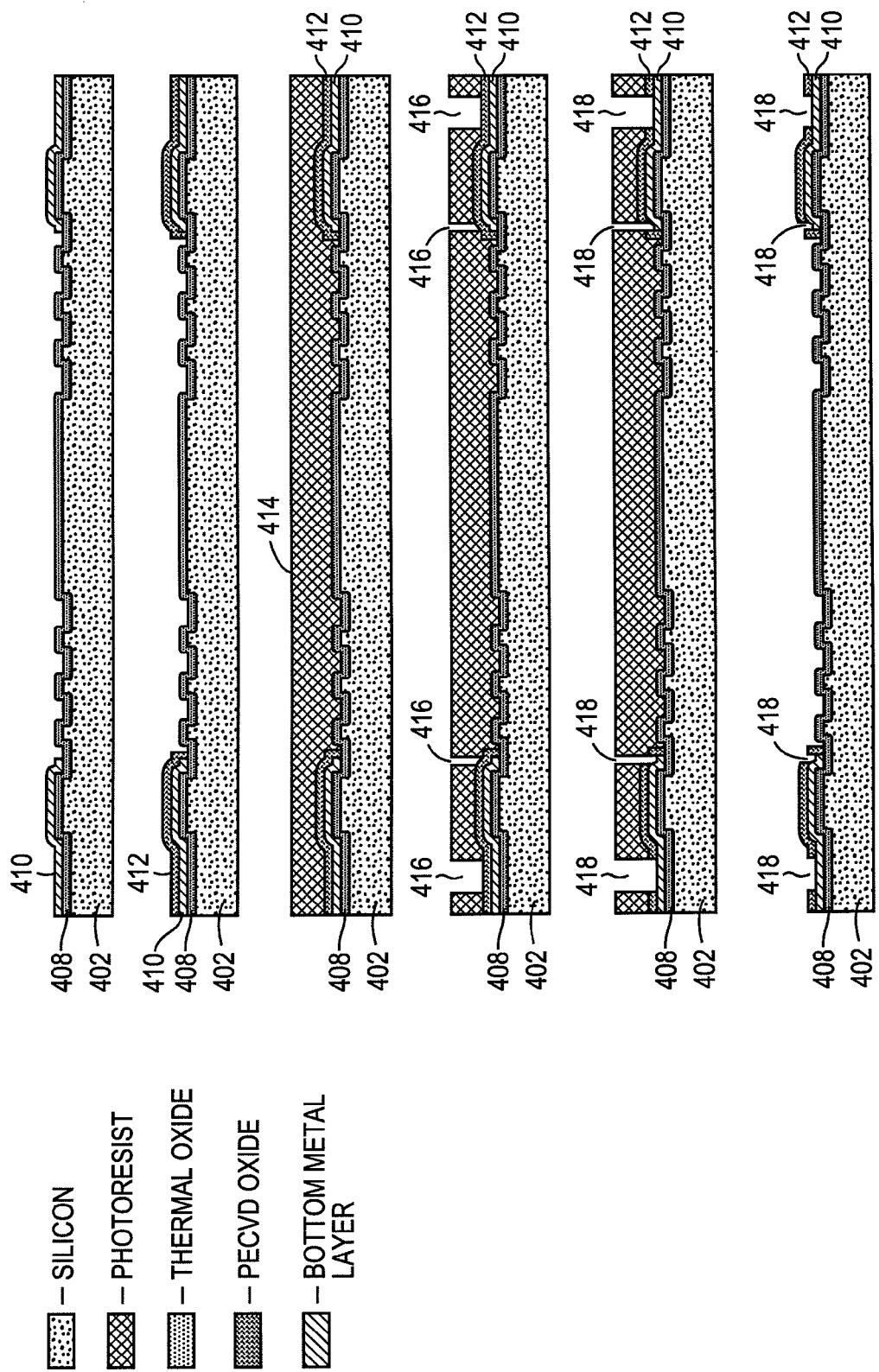
Figure 4D:
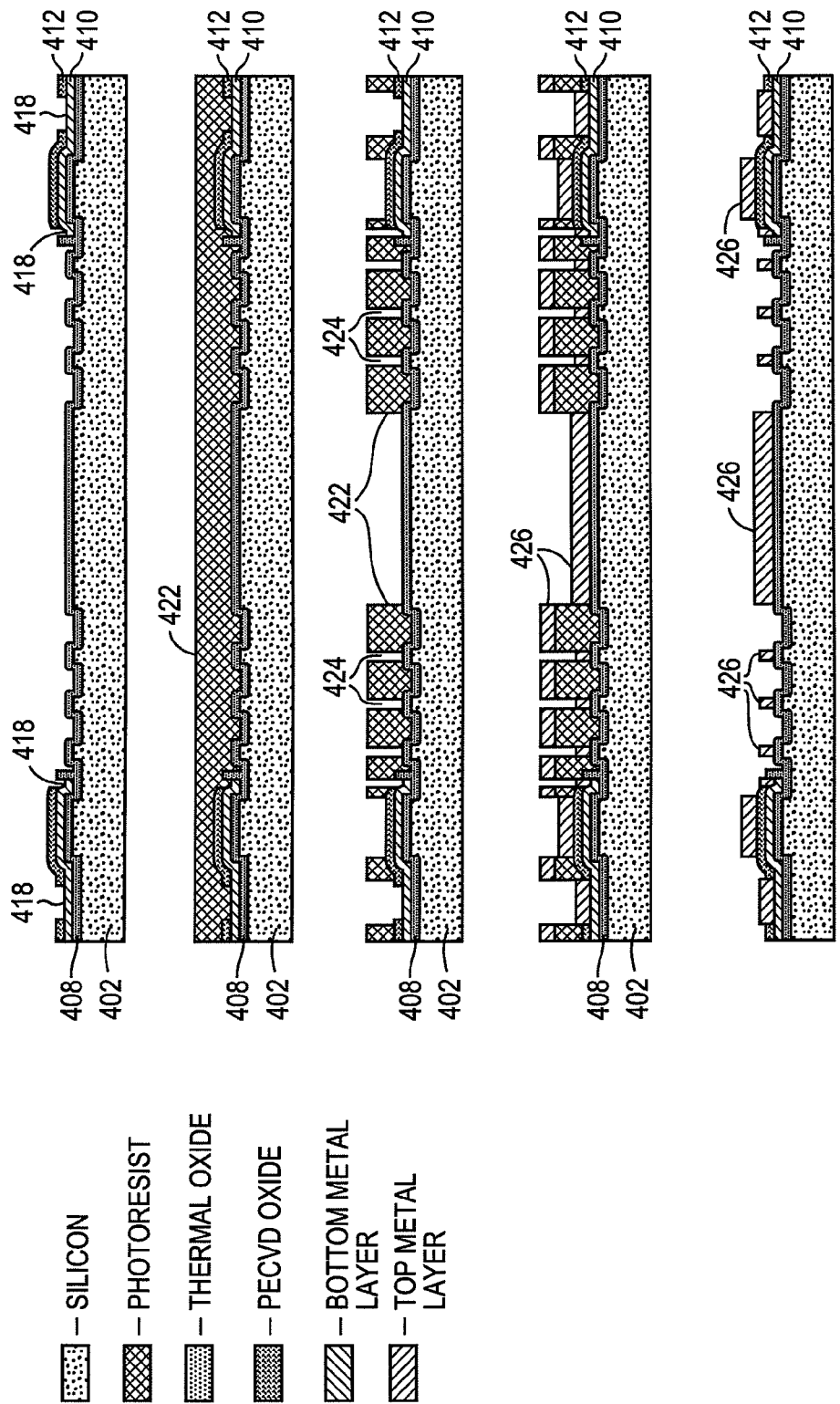
Figure 4E:
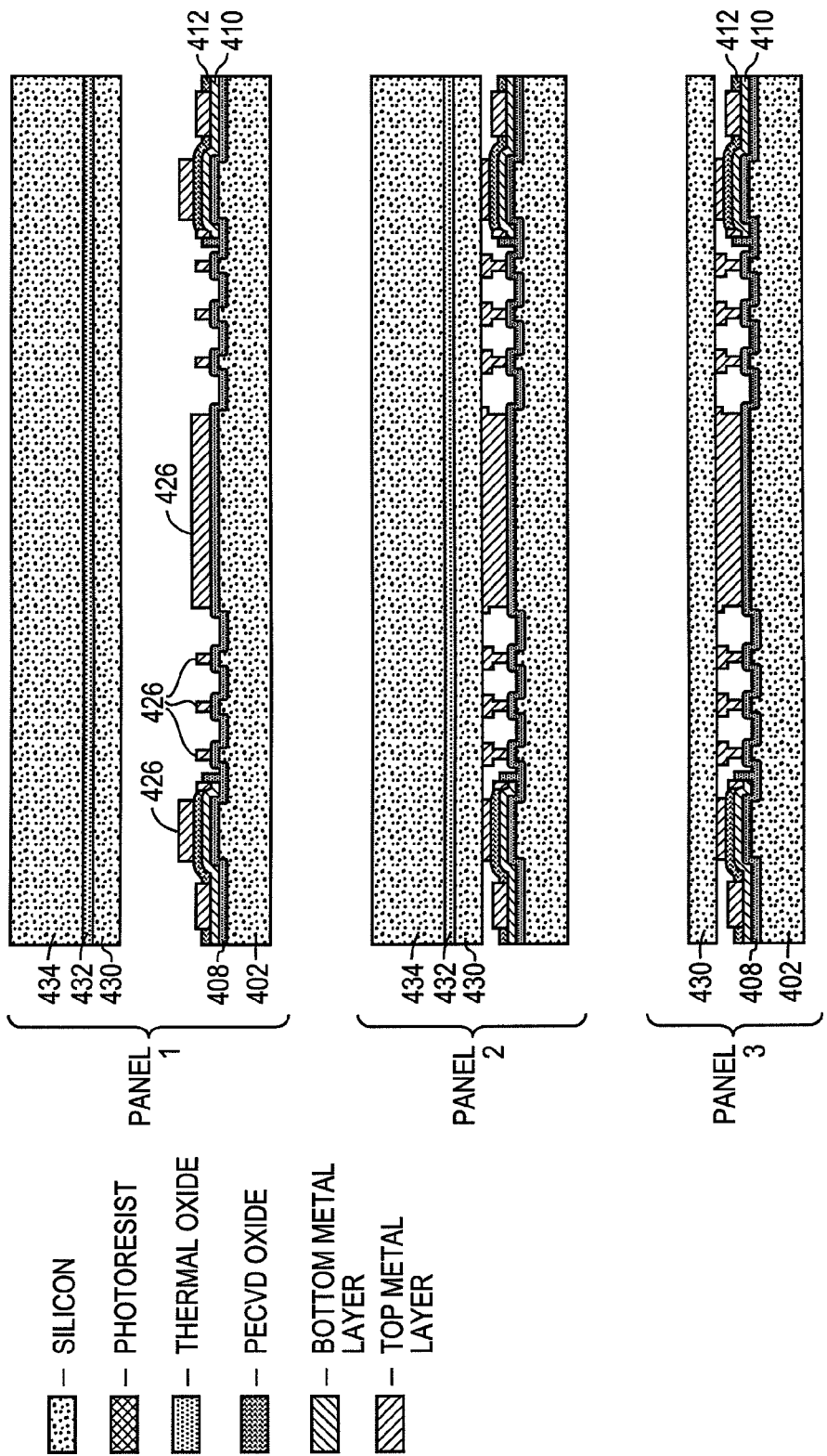
Figure 4F:
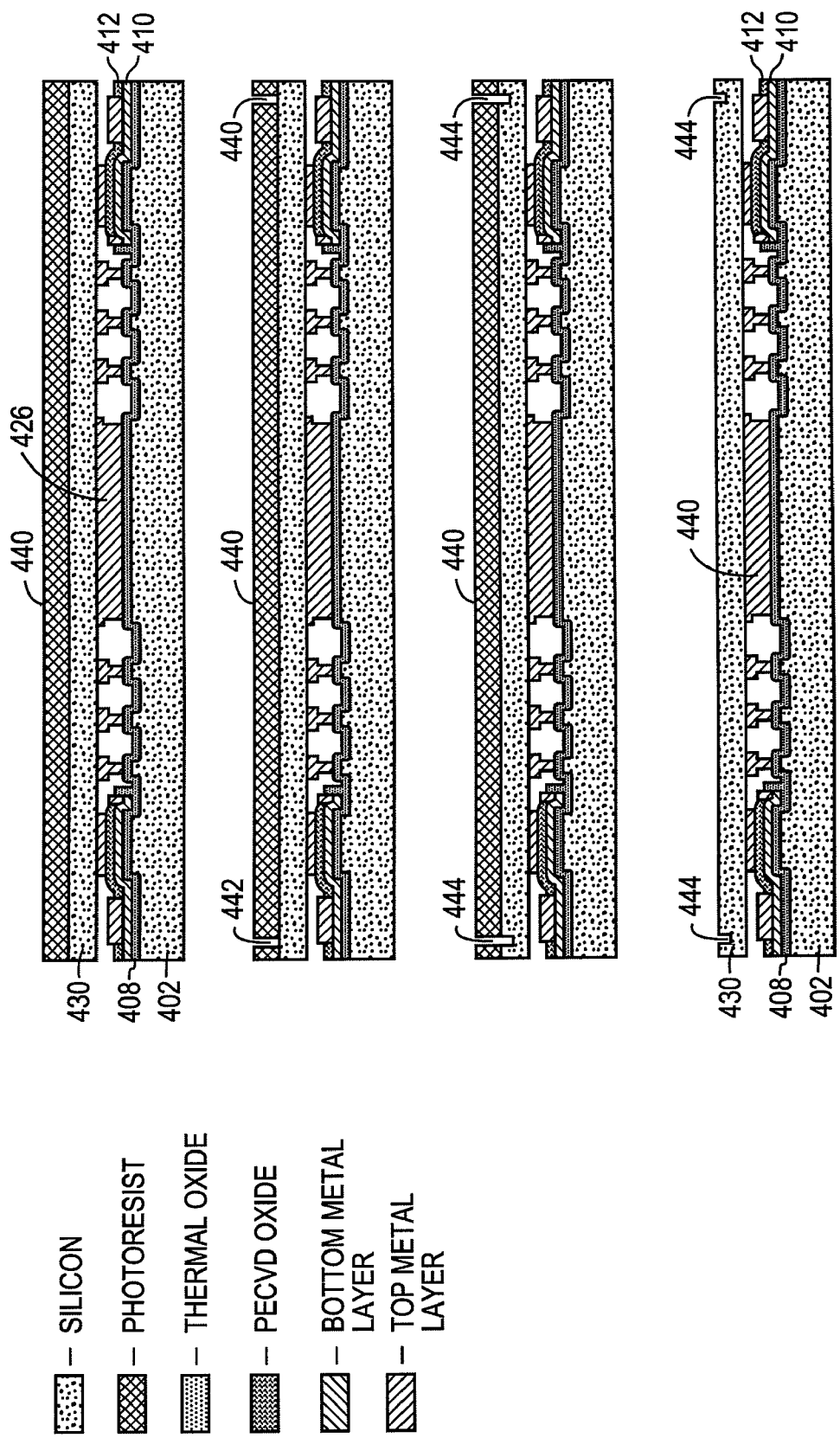
Figure 4G:
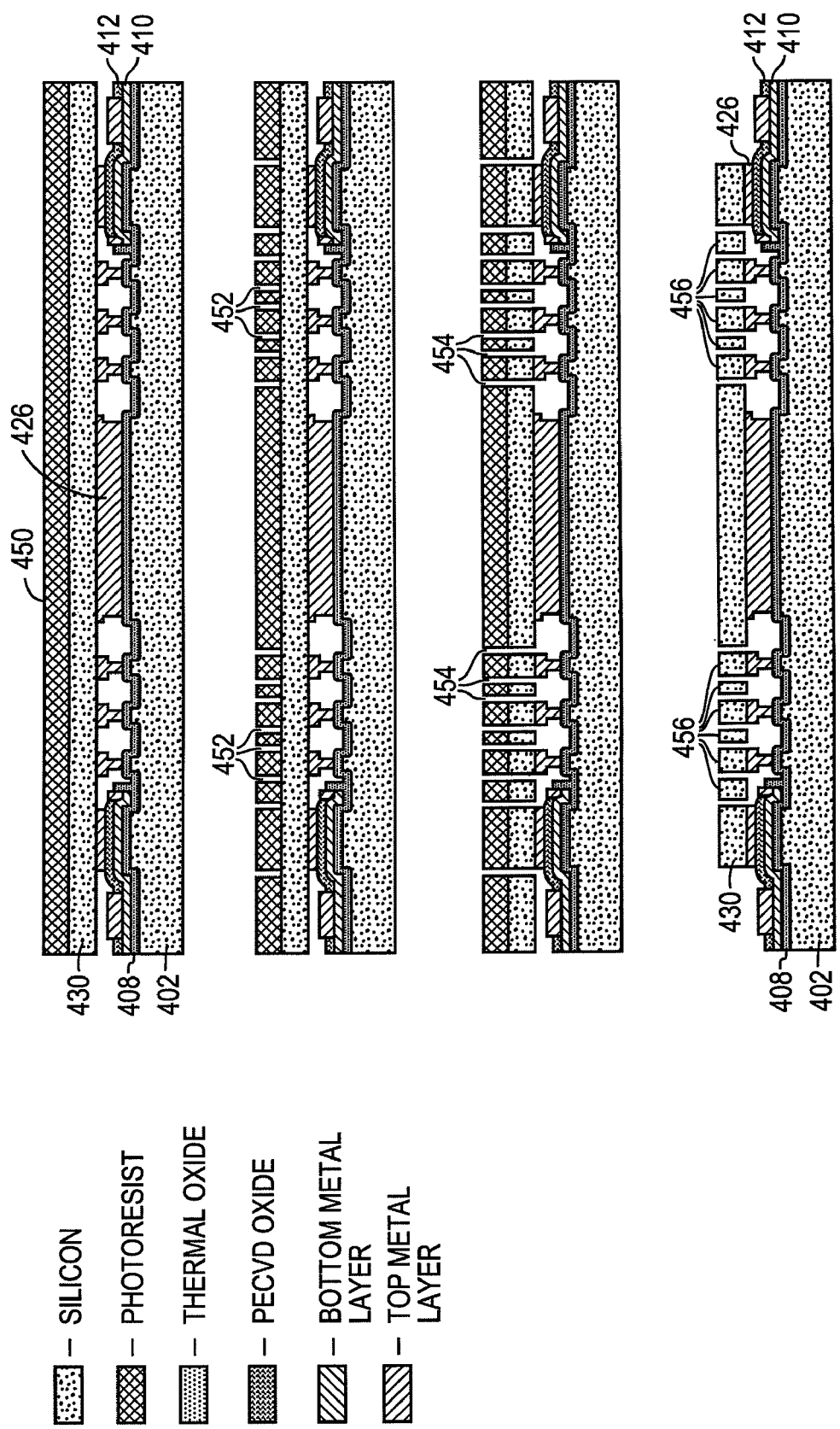

One embodiment of the fabrication process according to principles of the invention is illustrated schematically in FIGS. 4A-4G. FIGS. 4A-4G are cross sectional illustrations taken through a DRG along a diameter thereof. FIGS. 4A-4G are exaggerated in the vertical dimension for clarity. In FIGS. 4A-4G, panels are presented that illustrate the result of successive steps of the fabrication process for a DRG. FIGS. 4A-4G are symmetric about a vertical axis in the center of the wafer, and features illustrated and/or described to be present on one half (e.g., the right half or the left half) of a panel are in general also present on the other half in mirror relation about the vertical axis. FIGS. 4A-4D illustrate the fabrication steps used in making a baseplate. FIG. 4E illustrates the bonding on a blank resonator wafer to the fabricated baseplate. FIGS. 4F-4G illustrate the steps in providing the fabricated resonator wafer without having to perform steps of aligning and bonding two pre-fabricated sections, a base plate and a resonator wafer.

Turning to FIG. 4A, the topmost panel shows in schematic cross section a silicon wafer 402. The second panel from the top shows the silicon wafer 402 overcoated with photoresist 404. The third panel from the top shows the silicon wafer 402 after the photoresist 404 has been exposed and developed so as to leave regions of the surface of the silicon wafer 402 covered with photoresist 404 and other regions of the silicon wafer 402 uncovered. In the fourth panel from the top, silicon has been etched away, for example using a reactive ion etch, to produce a plurality of pillars 406. In the fifth panel from the top, the photoresist has been stripped off the silicon wafer 402 using a suitable stripping agent, and the pillars 406 are clearly seen. In the bottom panel of FIG. 4A, an oxide layer 408 is provided on the surface of the silicon wafer 402 upon which the pillars 406 have been produced. The oxidation process that can be used to create the oxide layer 408 is in one embodiment thermal oxidation.

In the topmost panel of FIG. 4B, the bottom panel of FIG. 4A is again presented to represent the starting condition of the wafer as regards fabrication steps illustrated in FIG. 4B. In the second panel from the top of FIG. 4B, a layer of metal 410 is evaporated over the oxide layer 408. Oxide layer 408 is intended to insulate the silicon substrate 402 from the metal layer 410. Examples of metals suitable for use in fabricating metal layer 410 are high conductivity metals such as copper, aluminum, gold. In addition, thin adhesion layers and/or diffusion barriers are used to improve adhesion. In the current embodiment a 100 A Ti/2000 A Au/150 A Ti multilayer is used. In the future it may be advantageous to use a W layer between Au and Ti as a diffusion barrier. In the third panel from the top of FIG. 4B, a layer of photoresist 412 is spun on the wafer over the evaporated metal 410. In the fourth panel from the top of FIG. 4B, the photoresist 412 is exposed and developed, leaving regions of the metal layer 410 exposed. In the fifth panel from the top of FIG. 4B, the exposed areas of the metal layer 410 are etched away, using wet etching, 0.5% BOE (buffered oxide etch) for Ti, and KI:I etch for Au. One can also use fluorine-based (such as $CF_4/O_2$) RIE plasma etching for Ti, and Ar plasma for Au. In the bottom panel of FIG. 4B, the remaining photoresist is removed, leaving the wafer 402 with regions of metallization 410 above areas of the oxide layer 408.

In the topmost panel of FIG. 4C, the bottom panel of FIG. 4B is again presented to represent the starting condition of the wafer as regards fabrication steps illustrated in FIG. 4C. In the second panel from the top of FIG. 4C, additional oxide 412 is provided to cover the exposed surfaces of metal layer 410. In one embodiment, the oxide 412 is deposited using a PECVD oxide deposition process. In the third panel from the top of FIG. 4C, a layer of photoresist 414 is spun on the wafer 402 over the PECVD oxide 412. In the fourth panel from the top of FIG. 4C, photolithographic methods are used to open regions 416 in the layer of photoresist 414 to permit opening vias to reach the metal layer 412. In the fifth panel from the top of FIG. 4C, the PECVD oxide 412 is etched, using for example a reactive ion etch, to create openings 418 in the PECVD oxide. In the bottom panel of FIG. 4C, openings 418 are seen to have been made at each extremity of the wafer 402, and the photoresist has been stripped using a conventional stripping agent.

In the topmost panel of FIG. 4D, the bottom panel of FIG. 4C is again presented to represent the starting condition of the wafer as regards fabrication steps illustrated in FIG. 4D. In the second panel from the top of FIG. 4D, a layer of photoresist 422 is spun on the exposed upper surface of the wafer 402 over the PECVD oxide 412 and other features that represent. In the third panel from the top of FIG. 4D, a plurality of openings 424 are created in the photoresist layer 422 using photolithographic methods, and developing the photoresist 422. In the fourth panel from the top of FIG. 4D, an additional layer of metal 426 is deposited over the developed photoresist 422, filling the openings 424 provided into developed photoresist layer 422. In the bottom panel of FIG. 4D, conventional liftoff methods, for example by dissolving away the photoresist 422 in a solvent, are used to remove the excess metal, and to leave in place regions of metal 426 in selected regions on the exposed surface of the wafer 402. The bottom panel of FIG. 4D represents the fabricated baseplate wafer.

In panel 1 of FIG. 4E, the fabricated baseplate wafer is illustrated, along with a free-standing blank resonator wafer comprising a silicon handle layer 434, an intermediate oxide layer 432, and a thin silicon resonator layer 430. In one embodiment, the free-standing blank resonator wafer is a conventional silicon-on-insulator ("SOI") wafer. The SOI wafer is a convenient object for providing a thin silicon membrane that can be bonded to the fabricated baseplate wafer, and then have the silicon handle layer 434 removed, for example by etching down to the silicon oxide layer 432, and thereafter removing the silicon oxide layer 432. Other kinds of wafers that can provide a thin silicon membrane attached to the fabricated baseplate wafer could in principle also be employed. In panel 1 of FIG. 4E, the fabricated baseplate wafer and the blank resonator wafer are not yet bonded together. Because there are no features yet provided in the blank resonator wafer, the precise alignment between the fabricated baseplate wafer and the blank resonator wafer is unimportant. In panel 2 of FIG. 4E, the fabricated baseplate wafer and the blank resonator wafer are bonded, for example using a eutectic bonding composition. In one embodiment, eutectic bonding is done by compressing gold to bare Si (or Si protected by a gold layer) at temperatures above the Au/Si eutectic temperature (363 C). In panel 3 of FIG. 4E, the silicon handle layer 434 and the silicon oxide layer 432 of the blank resonator wafer have been removed.

In the topmost panel of FIG. 4F, the free surface of the blank resonator wafer 430 is overcoated with a layer of photoresist 440, and the fabricated baseplate wafer is shown bonded to the bottom surface of the blank resonator wafer 430. In the second panel from the top of FIG. 4F, the photoresist 440 is exposed and developed to provide regions 442 representing locating marks. As indicted hereinabove, the locating marks can be defined based on any convenient feature of the fabricated baseplate that can be visualized, including using visible or infrared methods to visualize a feature of the fabricated baseplate as a reference location. In the third panel from the top of FIG. 4F, the locating marks 444 are affixed to the blank resonator wafer, for example by etching, by exposure to an energy beam of electromagnetic radiation such as laser light, to a beam of charged particles, or to deposited metal, deposited ink or other deposited marking medium. In the bottom panel of FIG. 4F, the photoresist layer 440 has been removed using conventional photoresist stripping methods, and the locating marks 444 are schematically illustrated as etched pits in the upper surface of the otherwise blank resonator wafer. As will be understood, the locating marks can be situated anywhere on the free surface of the blank resonator wafer, and can be of different size, shape, and type in different locations or regions of the otherwise blank resonator wafer. The locating marks can be as simple as one or more dots or etched pits, or cross marks, to specific geometric shapes, alphanumeric symbols, or other meaningful locating marks.

In the topmost panel of FIG. 4G, the free surface of the blank resonator wafer 430 is overcoated with a layer of photoresist 450, and the fabricated baseplate wafer is shown bonded to the bottom surface of the blank resonator wafer 430. In the topmost panel, the locating marks 444 are omitted, but should be understood to be present. In the second panel from the top of FIG. 4G, a plurality of openings 452 are produced in the layer of photoresist 450 by conventional exposure and developing methods. In the third panel from the top of FIG. 4G, the resonator wafer 430 is subjected to etching, to remove material so as to leave regions of the resonator disc that are bonded to the fabricated baseplate as indicated by segments of resonator wafer 430 that are in contact with metal 426, and other regions of the resonator disc are free to move and are not bonded to the fabricated baseplate as indicated by segments of resonator wafer 430 that are not in contact with metal 426. In the bottom panel of FIG. 4G, the photoresist 450 has been stripped using conventional stripping methods and the aligned resonator wafer and fabricated baseplate are shown as a fabricated DRG.

Figure 5A:
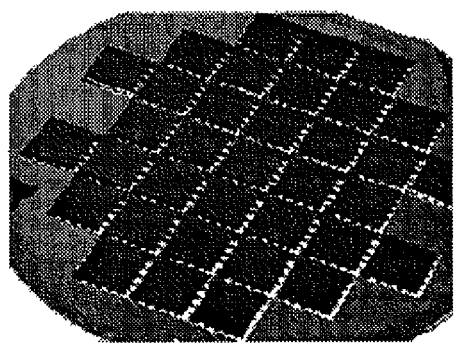
FIG. 5A is an illustration of a wafer comprising a plurality of prior art silicon DRG devices.
Figure 5B:
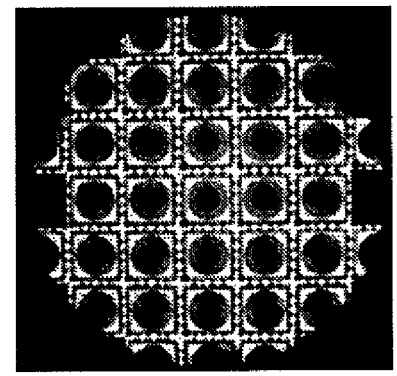
FIG. 5B is an illustration showing an IR microscopy image of a silicon DRG that shows the die underneath the silicon cap.

FIG. 5A is an illustration of a wafer comprising a plurality of prior art Si DRG devices. FIG. 5B is an illustration showing an IR microscopy image of a silicon DRG that shows the die underneath the silicon cap.

Some of the equipment that is expected to be useful in making the exemplary DRGs includes a GCA Projection Wafer Stepper and an STS Deep Reactive Ion Etcher. The GCA Stepper/Aligner Model 6800 with modified 8000 series Theta II stages is a 5× reduction projection wafer stepper, with a resolution of 0.7 μm (numerical aperture of 0.4), and an alignment accuracy of 0.25 μm. The STS DRIE system utilizes inductively coupled, time multiplexed, plasmas of SF6 and C4F8 gases in order to anisotropically etch silicon. These two plasmas sequentially passivity and etch the silicon until a desired depth is reached. This process, known as the Bosch process, can lead to aspect ratios up to 30.1, profile control up to 90°, with etch rates up to 6 μm/min.

Another useful apparatus is the STS AOE (Advanced Oxide Etcher), which uses fluorine chemistry and a high density inductively coupled plasma to etch deeply (>50 microns) into oxides, glasses and quartz at rates up to 0.5 microns per minute with high selectivity. Typically metal masks are used to resist the ion bombardment. This machine is also capable of anisotropic etching of ceramics.

Packaging of Completed DRGs

Figure 6:
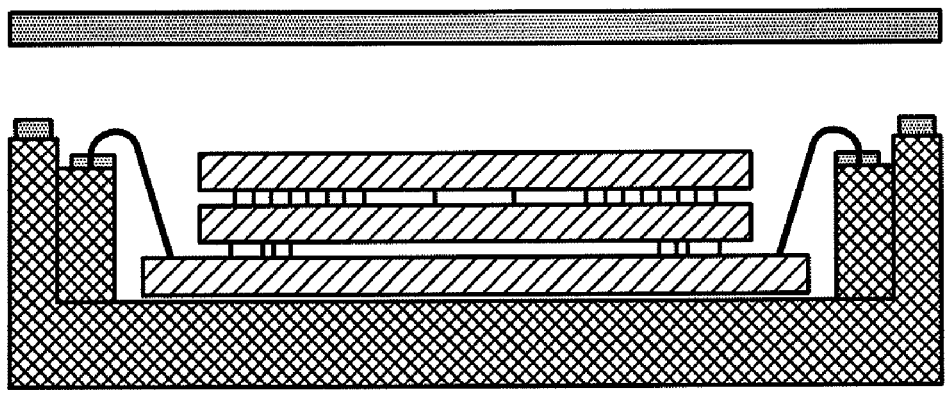
FIG. 6 is a diagram showing a cross sectional view of a vacuum package with a DRG die situated therein.

It is expected that DRGs can be packaged using COTS LCC ceramic vacuum packages. The lids for these packages are expected to be provided with evaporable getter material, for example applied by deposition (available from Nanogetters Inc. of 391 Airport Industrial Drive, Ypsilanti, Mich. 48198). It is expected that Au/Sn performs will be attached to the packages. DRG die are expected to be packaged using the ceramic packages, lids with getter material deposited and a carbon chuck, using an elevated temperature vacuum process to seal the assembled packages. Vacuum packaged die are expected to be re-characterized as a check on the packaging process, and to ensure vacuum integrity over time. A cross sectional view of a vacuum package with a DRG die situated therein in shown in FIG. 6. Bond wires are shown for connecting the DRG to electrical access points on the package.

Figure 7:
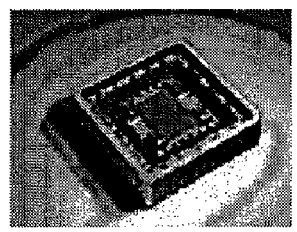
FIG. 7 is a diagram illustrating a concept for a DRG with an ASIC in a LCC package.

FIG. 7 is a diagram illustrating a concept for a DRG with an ASIC in a LCC package.

Figure 8:
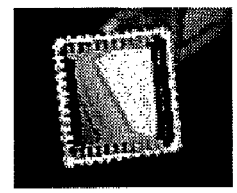
FIG. 8 is a diagram showing a leaderless chip carrier (LCC) package.

The DRG was designed to be compatible with wafer scale vacuum packaging and vacuum packaging using COTS (commercial off-the-shelf) IC packages. Wafer scale vacuum packaging is a process still under development. However, it is known that reliable vacuum packaging in COTS IC packages is viable with current, state-of-the-art industry packaging equipment. The leadless chip carrier (LCC) package shown in FIG. 8 measures 0.65"×0.65"×0.15". The batch sealing of these types of packages down to $10^{-4}$ torr is possible with the newest vacuum sealing system (model 3150) manufactured by SST International. The 3150 system allows for differential heating of lid and package, while under vacuum, for getter activation.

The steps involved in a prior art COTS vacuum packaging process include:
 a. Solder bond gyro to COTS package using preform
 b. Tack weld Au/Sn preform to package
 c. Deposit evaporable getter to Kovar lid
 d. In vacuum, heat lid to 400° C. for getter activation; heat package to 280° C.
 e. Align lid to getter and bring into contact In the packaging process, there appear to be no unresolved issues because the 3150 SST vacuum packaging system has shown the ability to reliably and repeatedly achieve vacuums of $10^{-4}$ torr in similar ceramic packages. A package specific carbon chuck must be designed and manufactured to ensure package and lid alignment. Some process development is required to ensure that the requisite temperatures are attained for the specific thermal load put into the chamber.

Electronics

A resonant vibratory sensor requires a power supply and control and sense electronics to operate. Discreet, bipolar analog electronics has been built tested and demonstrated for operation with the DRG.

Figure 9:
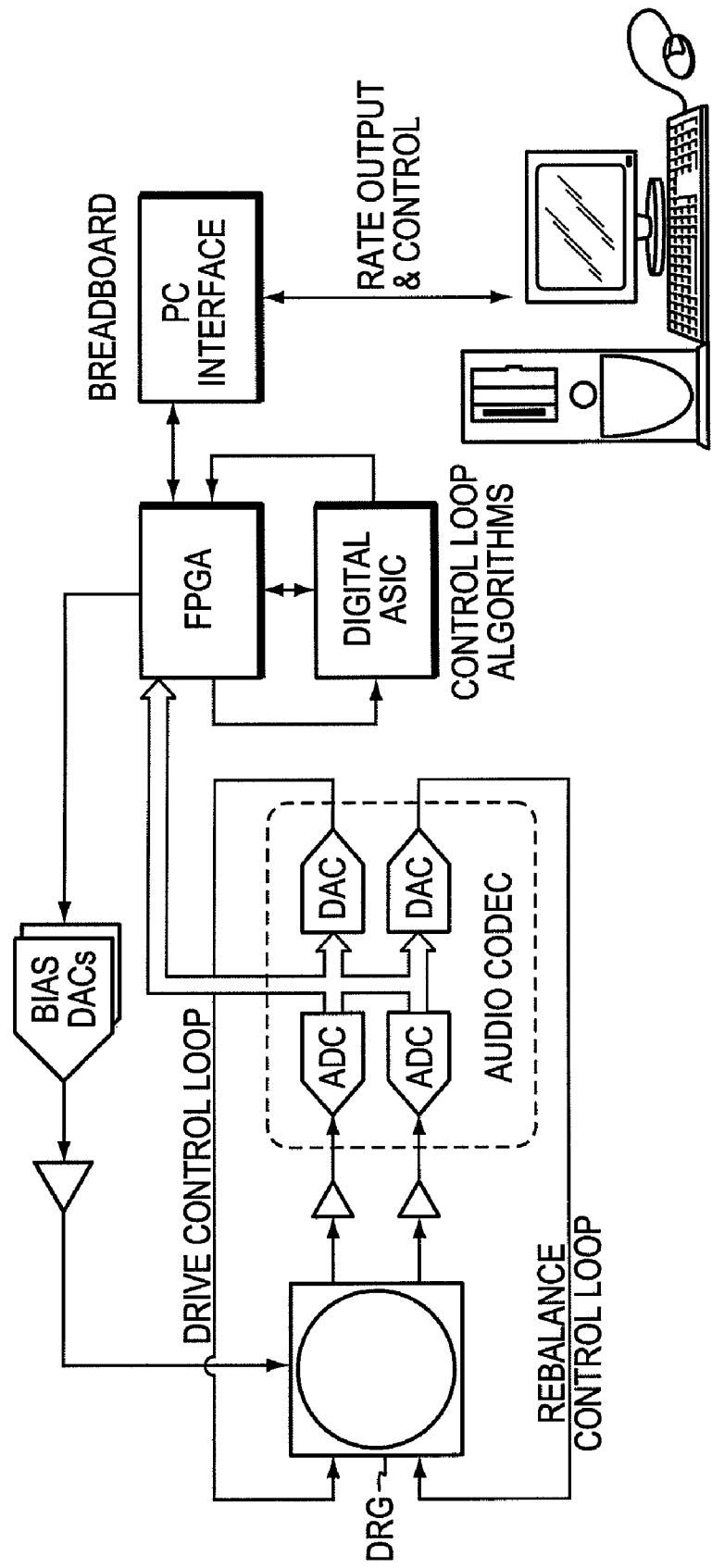
FIG. 9 is a diagram that illustrates an ASCI Breadboard Field Programmable Gate Array (FPGA) based digital electronics module that has been designed for the DRG.

FIG. 9 is a diagram that illustrates an ASCI Breadboard Field Programmable Gate Array (FPGA) based digital electronics module that has been designed for the DRG.

As illustrated in FIG. 9, the electronics module comprises three control loops, a drive control loop, a rebalance control loop, and an algorithm-based control loop output. In addition, the electronic module comprises rate and quadrature demodulation circuits, and electrostatic tuning biases. This electronics module uses analog interfaces to connect with the vibratory resonator sensor via a plurality of electrodes in symmetric patterns on the electrical baseplate that make a set of capacitors with the conductively coated resonator. The resonator itself is biased at a DC voltage, for example 60 volts.

A set of DC bias electrodes are used to tune the resonator using electrostatic spring softening so that its two degenerate oscillation modes (Mode #1 and Mode #2) become degenerate in frequency. One set of drive electrodes are used to excite oscillation in the Mode #1 direction, and a second set of electrodes is used to sense the oscillation in the Mode #2 direction. In one embodiment, this vibratory motion is kept constant via a positive feedback drive loop which automatically locks onto the natural frequency of the resonator. In some embodiments, automatic gain control (AGC) is used to adjust the gain in this drive loop to maintain a constant amplitude of oscillation. The AGC can be implemented in hardware or in software.

Any inertial rotation of the gyroscope around the $\Omega$ axis (or $\Omega$ rotation vector, as shown in FIG. 1C) transfers vibratory energy into the second mode (Mode #2), and generates a baseband analog voltage proportional to the inertial rate the gyroscope is undergoing about the $\Omega$ axis. Motion in the Mode #2 orientation is sensed via the second set of electrodes that feed into amplifiers, for example transimpedance amplifiers. This motion in the sense (Mode #2) direction is fed directly back in the rebalance control loop with negative feedback, effectively nulling the transferred vibrational energy. The torque needed to null this motion encodes the inertial rate as an amplitude modulated signal in phase with the drive vibration motion (Mode #1). The signals can be processed in either analog or digital processing methods. In the electronics module shown in FIG. 9, the analog signals observed in each of the drive control loop and the rebalance control loop are converted from analog to digital signals using analog-to-digital converters (DACs) and the signals are then processed in the FPGA and digital ASIC. The processed digital signals are used to measure the inertial rate and other operational parameters of interest, and to permit the generation of control signals to be applied to the drive control loop and to the rebalance control loop. The control signals are converted from digital to analog signals in digital-to-analog converters (DACs) and are applied to the respective sets of control pads on the vibratory resonator sensor.

FIG. 9 also illustrates a PC interface and a personal computer including input/output (I/O) of conventional type (such as a keyboard, mouse and display) and machine-readable storage media, such as program and data memory. The personal computer is a conventional general purpose programmable computer. In this embodiment, the personal computer can be used by a user to interact with the electronics module to program the module, to observe the operation of the vibratory resonator sensor (for example during testing) and to interact with the vibratory resonator sensor and the electronics module to observe the behavior of the vibratory resonator sensor and the electronics module in operation. In other embodiments, the PC interface can be replaced with any functionally equivalent interface, including a hardwired interface, an interface connected via radio or other electromagnetic signals not propagated on a wired connection, or via optical signals. In other embodiments, the personal computer can be replaced with any suitable programmable computer, ranging from a handheld microprocessor based device such as a PDA, or a smartphone, through a laptop computer, and including a server, a minicomputer, and a mainframe computer.

In one embodiment, the electronics module comprises loops that are symmetric with respect to the Mode #1 and Mode #2 directions, so that the drive and sense axes can be reversed electronically. This feature of the electronics module allows easy tuning of the device and allows compensation of damping induced rate drift which is cancelable to first order using a drive axis switching technique. In some embodiments, a set of switches can be included so that the drive and sense axes can be reversed via a single digital control line's level shift.

The gyroscope's final rate output signal is generated by the synchronous demodulation of the Mode #1 and Mode #2 signals. An additional demodulation of the sense (Mode #2) signal with a 90° phase shifted copy of the Mode #1 signal can be used to produce a quadrature signal (a measure of improper stiffness coupling between the modes). Feeding this quadrature signal back via a proportional-integral (PI) controller to the tuning bias can be used to automatically null this improper stiffness coupling. In addition, the Mode #1 signal itself can be output to any testing or IMU electronics for other purposes, such as for use in temperature compensation algorithms. As will be recognized, many functions that have traditionally been performed using analog circuitry can also be performed using digital signal processing methods. The present disclosure contemplates the use of digital signal processing methods. The use of conventional prior art power supplies of any form suitable for providing power to the vibratory resonator sensor, to its control circuitry, and to any circuitry needed to interact with the vibratory resonator sensor and its control circuit is also contemplated.

Testing

A testbed developed for silicon and quartz DRGs comprises a single and a two axis rate table. Unpackaged gyroscopes are tested in a vacuum chamber mounted atop a single axis rate table. Packaged gyroscopes are tested within the two axis rate table, which can also perform temperature testing.

General Purpose Programmable Computers

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of Unix, or of Linux.

Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

It is believed based on theoretical considerations that the performance of a MEMS-based resonant vibratory sensor can be increased by observing that the output signal of any resonant vibratory sensor is proportional to $2\pi Q/\phi$, also referred to as the ring down time for the resonant vibratory sensor. Q represents the so-called "quality factor" for the resonant vibratory sensor, whereas $\omega$ is equal to the resonant (angular) frequency of the sense mode of the sensor. The thermoelastic quality factor, $Q_{TE}$, is calculated in accordance with the equation:

$$Q_{TE} = Q_o \left[ \frac{1 + (\omega\tau)^2}{2(\omega\tau)} \right]$$

where $$Q_o = \frac{2C_v}{E\alpha^2 T_o}$$

$C_v$=specific heat capacity
E=Young's modulus
$\alpha$=coefficient of thermal expansion
$T_o$=nominal resonator temperature
$\tau$=thermal relaxation time
$\omega=2\pi*$(frequency of oscillation).

Scrutiny of this equation reveals that the quality factor is strongly dependent on the absolute temperature and various intrinsic material properties for the given design of a resonant vibratory sensor. Therefore, it follows that increasing the quality factor through a change in the material from which the resonant vibratory sensor is formed will boost the sensitivity of the resonant vibratory sensor by increasing the amplitude of its output signal. Moreover, as noted in the literature (see, e.g., T. V. Roszhart, "The effect of thermoelastic internal friction on the Q of micromachined silicon resonators", IEEE Solid State Sensor and Actuator Workshop, Hilton Head, S.C., 6 4-7, 489, 1990), for a given resonant vibratory sensor the maximum heat flow due to acoustic mode coupling to the strain field (i.e., the minimum thermoelastic quality factor, $Q_{TE}$) arises when the thermal relaxation time constant for the resonant vibratory sensor is equal to the reciprocal of the vibration frequency. Additionally, for a given resonant vibratory sensor, it has been further observed that $Q_{TE}$ for the resonant vibratory sensor can be increased by minimizing anchor losses, losses due to bulk material defects, and surface effects.

Despite these observations, it is also understood that the value of $Q_{TE}$ can be increased only to a certain degree for a given resonant vibratory sensor. In other words, a theoretical maximum $Q_{TE}$ value exists for a resonant vibratory sensor due to heat flow driven by local temperature gradients within the resonant vibratory sensor that result from the strain field within the medium. This theoretical maximum $Q_{TE}$ for a given resonant vibratory sensor is determined primarily by geometric factors and the properties of the material from which the resonant vibratory sensor is fabricated.

For a given resonator, Q can be increased by minimizing anchor losses, losses due to bulk material defects and surface effects. However, a theoretical maximum Q value would still exist due to heat flow driven by local temperature gradients within the resonator resulting from the strain field within the medium. This theoretical maximum quality factor for a given resonator is determined primarily by geometric factors and the properties of the material that the resonator is fabricated from. This theory of thermoelastic damping effects is certainly not new. Originally developed by Zener (Phys. Rev. 52, 230, 1937), it has been refined by Lifshitz and Roukes (Physical Review B, 61, 5600, 2000) and Houston et. al (Appl. Phys. Ltrs, 80, 1300, 2002). Thermoelastic damping has been verified empirically as a major energy loss mechanism in MEMS structures by Duwel et. al (Sensors and Actuators A, 103, 70, 2003). These theoretical and empirical results lead one to the conclusion that materials with low thermal expansion coefficients are needed for producing the highest Q micromechanical resonators.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. A method of fabricating a resonant vibratory sensor, comprising the steps of:
   providing a fabricated baseplate wafer having present thereon at least one locating mark;
   observing a location of said at least one locating mark;
   bonding to said fabricated baseplate wafer a blank resonator wafer;
   affixing to said otherwise blank resonator wafer at least one locating mark at a location defined relative to said at least one locating mark that was observed on said fabricated baseplate; and
   fabricating the resonator structure in said blank resonator wafer in relation to said at least one locating mark affixed to said blank resonator wafer;
   thereby fabricating a resonant vibratory sensor.

2. The method of fabricating the resonant vibratory sensor of claim 1, wherein said resonant vibratory sensor is a disc resonator gyroscope.

3. The method of fabricating the resonant vibratory sensor of claim 2, wherein said disc resonator gyroscope is fabricated in silicon.

4. A resonant vibratory sensor, comprising:
   a fabricated baseplate wafer having present thereon at least one locating mark in a specified location; and
   a resonator wafer bonded to said fabricated baseplate, said resonator wafer comprising at least one locating mark affixed to said otherwise blank resonator wafer at a location defined relative to said at least one locating mark of said fabricated baseplate, and a structure fabricated according to a pattern based at least in part upon said location of said at least one locating mark affixed to said otherwise blank resonator wafer.

5. The resonant vibratory sensor of claim 4, wherein said resonant vibratory sensor is a disc resonator gyroscope.

6. The resonant vibratory sensor of claim 5, wherein said disc resonator gyroscope is fabricated in silicon.

7. The resonant vibratory sensor of claim 4, wherein said at least one locating mark is configured to be observed after said resonator wafer is bonded to said fabricated baseplate.

* * * * *